(12) United States Patent
Chang (10) Patent No.: US 11,588,947 B2
(45) Date of Patent: Feb. 21, 2023

(54) IMAGE SCANNING DEVICE AND IMAGE SCANNING EQUIPMENT

(71) Applicant: Avision Inc., Hsinchu (TW)

(72) Inventor: Min-Hao Chang, Hsinchu (TW)

(73) Assignee: AVISION INC., Hsinchu (TW)

( * ) Notice: Subject to any disclaimer, the term of this patent is extended or adjusted under 35 U.S.C. 154(b) by 0 days.

(21) Appl. No.: 17/692,239

(22) Filed: Mar. 11, 2022

(65) Prior Publication Data
US 2022/0337715 A1    Oct. 20, 2022

(30) Foreign Application Priority Data

Apr. 16, 2021 (TW) ................................ 110113830

(51) Int. Cl.
*H04N 1/00*    (2006.01)
*H04N 1/028*    (2006.01)

(52) U.S. Cl.
CPC ..... *H04N 1/00602* (2013.01); *H04N 1/00588* (2013.01); *H04N 1/00737* (2013.01); *H04N 1/00909* (2013.01); *H04N 1/02865* (2013.01)

(58) Field of Classification Search
CPC ........ G03G 15/30; G03G 15/60; G03G 15/00; G03G 15/09; G03G 15/23; G03G 2221/1654; G03G 15/605; G03G 21/1647; G03G 2215/00185; G03G 2221/1606; G03G 15/55; G03G 15/751; G03G 21/0047; G03G 21/1661; G03G 2221/0005; G03G 2221/1627; G03G 2221/1633; G03G 2221/1657; G03G 2221/1672; G03G 2221/1678; G03G 2221/1684; G03G 2221/1869; G03G 15/04; G03G 15/28;
(Continued)

(56) References Cited

U.S. PATENT DOCUMENTS 10,841,441 B2 * 11/2020 Chen ................... H04N 1/00551
2004/0263921 A1 * 12/2004 Iwago ................. H04N 1/00602
                                                                358/474
(Continued)

FOREIGN PATENT DOCUMENTS

CN          101043571 A       9/2007
TW          200945876 A       11/2009
(Continued)

*Primary Examiner* — Negussie Worku
(74) *Attorney, Agent, or Firm* — McClure, Qualey & Rodack, LLP (57) ABSTRACT

An image scanning device includes a casing, a paper feeding wheel, a transparent plate, a light bar, and an elastic support member. The transparent plate includes a first surface and a second surface, and the first surface faces the paper feeding wheel. The light bar is located on the second surface of the transparent plate and includes a plurality of light-emitting elements. A position at which the paper feeding wheel is tangent to the first surface defines a tangent position, a position at which the light-emitting elements are projected onto the first surface in a normal direction of the first surface defines a scanning position, and a scanning spacing exists between the tangent position and the scanning position. The elastic support member pushes the light bar and the transparent plate toward the paper feeding wheel. An image scanning equipment with an image scanning device is also provided.

14 Claims, 5 Drawing Sheets

(58) Field of Classification Search
CPC .. G03G 15/305; G03G 15/346; G03G 15/602; G03G 2215/0187; G03G 2217/0025; G03G 15/22; G03G 15/6502; G03G 15/6523; G03G 21/0029; G03G 15/0896; G03G 15/26; G03G 15/5029; G03G 15/5033; G03G 17/04; G03G 2215/00189; G03G 13/16; G03G 15/0435; G03G 15/0806; G03G 15/16; G03G 15/167; G03G 15/227; G03G 15/24; G03G 15/263; G03G 5/0575; G03G 5/0578; G03G 7/004; G03G 9/12; G03G 15/0131; G03G 15/0266; G03G 15/0409; G03G 15/041; G03G 15/08; G03G 15/0822; G03G 15/0849; G03G 15/086; G03G 15/0877; G03G 15/0882; G03G 15/0889; G03G 15/101; G03G 15/108; G03G 15/11; G03G 15/162; G03G 15/1675; G03G 15/169; G03G 15/2003; G03G 15/221; G03G 15/283; G03G 15/5008; G03G 15/5016; G03G 15/502; G03G 15/6529; G03G 15/6594; G03G 15/754; G03G 21/16; G03G 21/1633; G03G 21/1666; G03G 21/1814; G03G 21/1821; G03G 21/1842; G03G 21/206; G03G 2215/00282; G03G 2215/0035; G03G 2215/00518; G03G 2215/068; G03G 2215/0687; G03G 2215/1623; G03G 2215/1661; G03G 2221/163; G03G 2221/1636; G03G 5/147; H04N 1/00588; H04N 1/00602; H04N 2201/0081; H04N 1/121; H04N 1/0057; H04N 1/04; H04N 1/00591; H04N 1/0318; H04N 2201/03145; H04N 1/193; H04N 2201/03112; H04N 2201/03141; H04N 5/225; H04N 2201/03133; H04N 1/1215; H04N 1/00519; H04N 1/00631; H04N 1/00737; H04N 1/031; H04N 1/1235; H04N 1/0061; H04N 1/00681; H04N 1/00702; H04N 1/00909; H04N 1/02815; H04N 1/02865; H04N 1/19594; H04N 2201/02495; H04N 2201/03125; H04N 2201/03129; H04N 2201/0317; H04N 1/00734; H04N 1/00755; H04N 1/00816; H04N 1/02409; H04N 1/028; H04N 1/02895; H04N 1/123; H04N 1/191; H04N 1/00572; H04N 1/0402; H04N 1/12; H04N 1/1911; H04N 2201/04789; H04N 1/00; H04N 1/00029; H04N 1/00204; H04N 1/00554; H04N 1/00599; H04N 1/00633; H04N 1/00649; H04N 1/0066; H04N 1/00663; H04N 1/00689; H04N 1/0071; H04N 1/00713; H04N 1/0774; H04N 1/00748; H04N 1/00774; H04N 1/0083; H04N 1/00925; H04N 1/0312; H04N 1/0315; H04N 1/0405; H04N 1/0443; H04N 1/0455; H04N 1/1065; H04N 1/107; H04N 1/1077; H04N 1/125; H04N 1/128; H04N 1/40; H04N 1/4076; H04N 2201/0094; H04N 2201/0096; H04N 2201/0456; H04N 2201/04755; H04N 7/183; H04N 1/00018; H04N 1/00127; H04N 1/00525; H04N 1/00527; H04N 1/00543; H04N 1/00559; H04N 1/00567; H04N 1/0058; H04N 1/00718; H04N 1/00745; H04N 1/00753; H04N 1/00782; H04N 1/00795; H04N 1/00798; H04N 1/00976; H04N 1/024; H04N 1/02825; H04N 1/0446; H04N 1/047; H04N 1/0607; H04N 1/1013; H04N 1/1026; H04N 1/1056; H04N 1/1135; H04N 1/1245; H04N 1/2032; H04N 1/207; H04N 1/3935; H04N 1/40062; H04N 1/401; H04N 1/407; H04N 1/409; H04N 1/508; H04N 1/56; H04N 1/6033; H04N 1/6407; H04N 13/305; H04N 2201/02425; H04N 2201/03116; H04N 2201/03175; H04N 2201/03195; H04N 2201/044; H04N 2201/0446; H04N 2201/0471; H04N 2201/04729; H04N 2201/04731; H04N 2201/04732; H04N 2201/04734; H04N 2201/04744; H04N 2201/04746; H04N 2201/04786; H04N 2201/04791; H04N 2213/001; H04N 5/247; H04N 5/64; H04N 5/84; B65H 1/04; B65H 1/266; B65H 1/14; B65H 2511/51; B65H 2801/39; B65H 35/06; B65H 16/02; B65H 23/063; B65H 23/1825; B65H 23/26; B65H 2404/262; B65H 2405/313; B65H 2701/19; B65H 2701/1912; B65H 3/02; B65H 3/24; B65H 35/02; B65H 39/06; B65H 5/025; B65H 5/062; B65H 83/02; B65H 1/18; B65H 1/81; B65H 19/30; B65H 2220/01; B65H 2220/02; B65H 23/195; B65H 2301/4212; B65H 2301/42122; B65H 2404/1521; B65H 2405/11151; B65H 2405/3321; B65H 2511/20; B65H 2511/212; B65H 2511/22; B65H 2513/40; B65H 2515/31; B65H 2515/60; B65H 2553/30; B65H 2553/412; B65H 2553/44; B65H 2557/512; B65H 2801/06; B65H 29/125; B65H 29/50; B65H 3/0684; B65H 31/00; B65H 31/02; B65H 5/06; B65H 5/26; B65H 67/02; B65H 7/00; B65H 7/02; B65H 7/04; B65H 1/06; B65H 16/00; B65H 2301/422; B65H 2404/10; B65H 2404/1531; B65H 2404/252; B65H 2404/255; B65H 2404/264; B65H 2404/268; B65H 2404/5311; B65H 2404/612; B65H 2511/521; B65H 2513/10; B65H 26/00; B65H 5/02; B65H 5/021; B65H 5/023; B65H 9/06; B65H 9/106

USPC ........................................................ 358/498

See application file for complete search history.

(56) References Cited

U.S. PATENT DOCUMENTS

| | | | | |
|---|---|---|---|---|
| 2008/0285093 | A1* | 11/2008 | Sheng | H04N 1/121 358/474 |
| 2009/0231643 | A1* | 9/2009 | Tan | H04N 1/203 358/497 |
| 2009/0284808 | A1* | 11/2009 | Hamada | H04N 1/1225 358/474 |
| 2017/0264772 | A1* | 9/2017 | Takahashi | H04N 1/0057 |

(56) References Cited

U.S. PATENT DOCUMENTS

2022/0131994 A1* 4/2022 Hozono ............... H04N 1/1061
2022/0337715 A1* 10/2022 Chang ................ H04N 1/00737

FOREIGN PATENT DOCUMENTS

TW       M405122 U    6/2011
TW     201440483 A   10/2014

* cited by examiner

IMAGE SCANNING DEVICE AND IMAGE SCANNING EQUIPMENT

CROSS-REFERENCE TO RELATED APPLICATION

This non-provisional application claims priority under 35 U.S.C. § 119(a) to Patent Application No. 110113830 filed in Taiwan, R.O.C. on Apr. 16, 2021, the entire contents of which are hereby incorporated by reference.

BACKGROUND

Technical Field

An image scanning device is provided, especially an image scanning device that uses a single drive roller wheel to entrain a document to move.

Related Art

Figure 1:
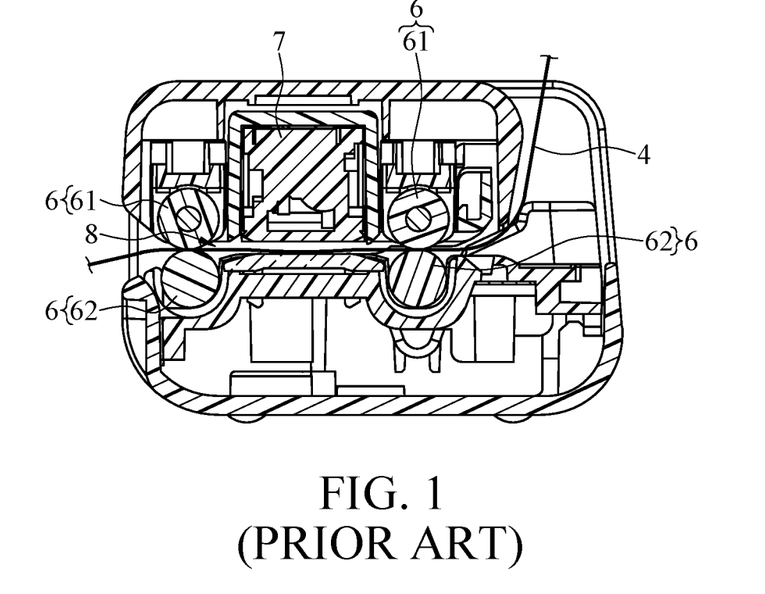
FIG. 1 is a cross-sectional view of an embodiment of an existing image scanning device.

Image scanning equipment is commonly used in various fields. FIG. 1 is a cross-sectional view of an embodiment of an existing image scanning device. In this embodiment, a plurality of rollers 6 are disposed adjacent to a photosensitive device 7 (CIS) to entrain to-be-scanned paper 4. The plurality of rollers 6 include a driven roller 61 and an active paper feeding roller 62. The driven roller 61 is on the same side as the photosensitive device 7, and with the structure, problems such as shaking up and down in the paper feeding channel 8, wrinkles and paper jams of the paper 4 are common, so that an image obtained upon scanning is not clear.

Figure 2:
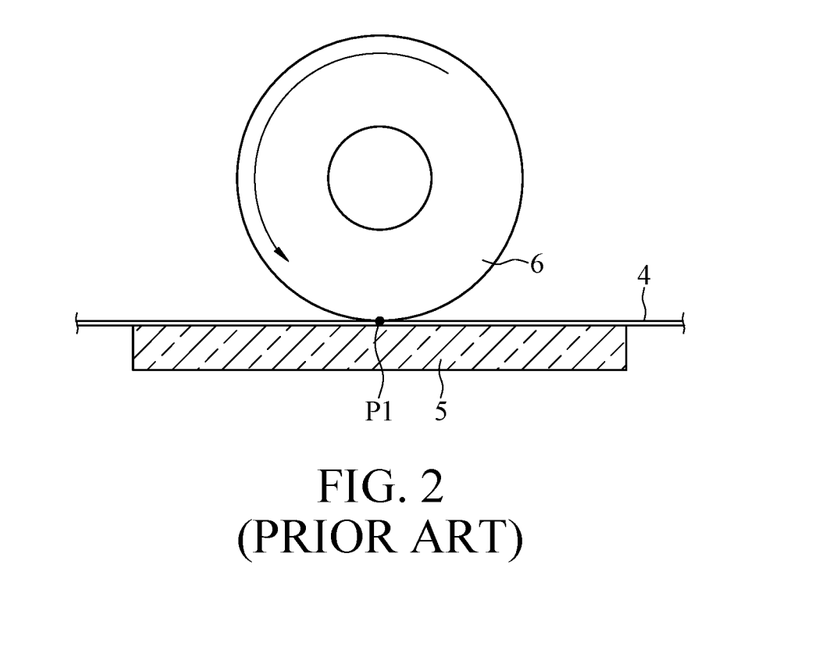
FIG. 2 is a cross-sectional view of another embodiment of the existing image scanning device.

In addition, FIG. 2 is a cross-sectional view of another embodiment of the existing image scanning device. The existing image scanning device is in use, and the paper 4 is entrained to move by the roller 6 at the same time and scanned facing the scanning light bar. Since a scanning position P1 (a position at which the scanning light bar scans the paper) is located at a position at which the roller 6 is tangent to a substrate 5 (such as a position of a glass plate). Therefore, after long-term use, a surface of the substrate 5 of the scanning light bar has dirt and ink that are difficult to clean, which affects the quality of subsequent image scanning.

SUMMARY

In view of this, an embodiment of the present invention provides an image scanning device adapted to scan a document, where the image scanning device includes a casing, a paper feeding wheel, a transparent plate, a light bar, and an elastic support member.

The casing has a paper feeding channel in communication with an outlet and an inlet on a surface of the casing. The paper feeding wheel is disposed in the casing and is partially located in the paper feeding channel.

The transparent plate is disposed in the casing and at least partially located in the paper feeding wheel. The transparent plate includes a first surface and a second surface opposite to each other, where the first surface faces the paper feeding wheel. The document enters through the inlet and passes between the paper feeding wheel and the first surface. The light bar is located on the second surface of the transparent plate, where the light bar includes a substrate and a plurality of light-emitting elements, where the light-emitting elements are distributed on the substrate in an extension direction of the substrate, where a position at which the paper feeding wheel is tangent to the first surface defines a tangent position, and a position at which the light-emitting elements are projected onto the first surface in a normal direction of the first surface defines a scanning position, where a scanning spacing exists between the tangent position and the scanning position. One end of the elastic support member is fixed to the casing, and an other end of the elastic support member is supported by the transparent plate to provide a pushing force for pushing the light bar and the transparent plate toward the paper feeding wheel.

In the image scanning device described above, in an embodiment, the scanning spacing is less than 5 mm.

In the image scanning device described above, in an embodiment, the scanning spacing is in a range of 2 mm to 3 mm.

In the image scanning device described above, in an embodiment, the casing further includes a base, where the base includes a groove, the transparent plate covers an opening of the groove, the light bar and the elastic support member are located in the groove, and the elastic support member is connected to the light bar.

In the image scanning device described above, in an embodiment, the groove includes two extension walls extending from side walls of the groove and located above the light bar.

In the image scanning device described above, in an embodiment, the casing includes an upper casing portion and a lower casing portion, where one end of the upper casing portion is pivotally connected to the lower casing portion, the paper feeding wheel is located in the upper casing portion, the transparent plate, the light bar, and the elastic support member are located in the lower casing portion, and the upper casing portion is engaged with the lower casing portion to form the paper feeding channel.

The present invention also provides image scanning equipment according to an embodiment, including any image scanning device as described above and an office machine, and the image scanning device is mounted to the office machine.

In the above image scanning equipment, in an embodiment, the image scanning device is located on one side of the office machine, the inlet is located above the outlet, and a direction from the inlet towards the outlet is perpendicular to the ground.

In the above image scanning equipment, in an embodiment, the office machine includes two driven rollers and two driving rollers, where the two driven rollers are respectively located on two sides of the driving rollers and are tangent to the same plane as the driving rollers. The two driving rollers are respectively located on two sides of the transparent plate, and the two driving rollers are jointly tangent to a plane on which the first surface of the transparent plate is located.

The image scanning device of the embodiment of the present invention has a single drive shaft wheel (the paper feeding wheel), and a scanning spacing exists between the position at which the paper feeding wheel is tangent to the transparent plate and the position at which the light-emitting elements are projected onto the transparent plate in a forward direction. Therefore, during scanning, the document is moved by the paper feeding wheel and then scanned by the light bar. Through such a structure, the problem of dirt on the transparent plate after long-term use can be effectively solved, and can cause the document to be smooth without wrinkles during the scanning, to obtain clear images, thus effectively solving the problem of the related art.

DETAILED DESCRIPTION

Figure 3:
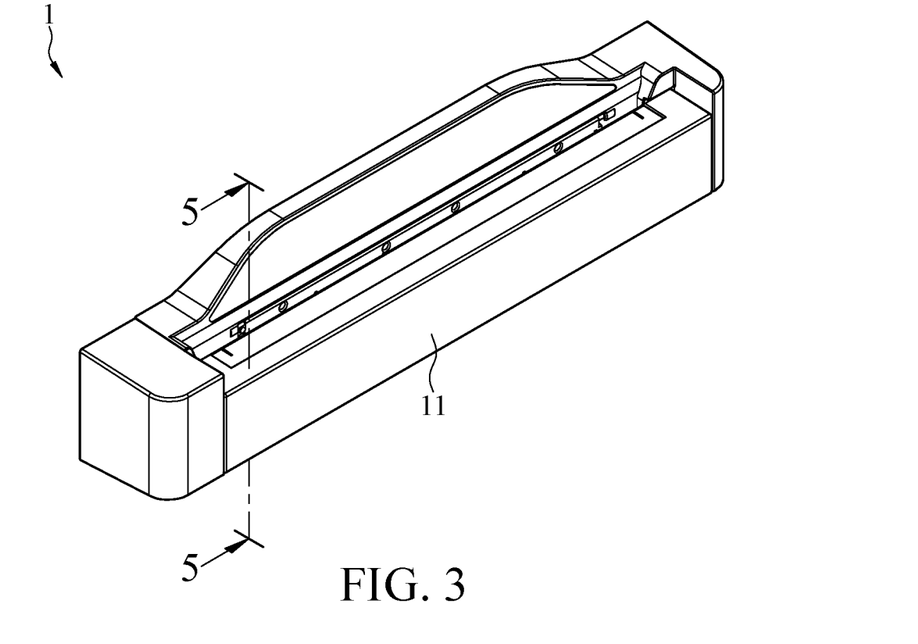
FIG. 3 is a schematic diagram of an appearance of an embodiment of the image scanning device according to the present invention.
Figure 4:
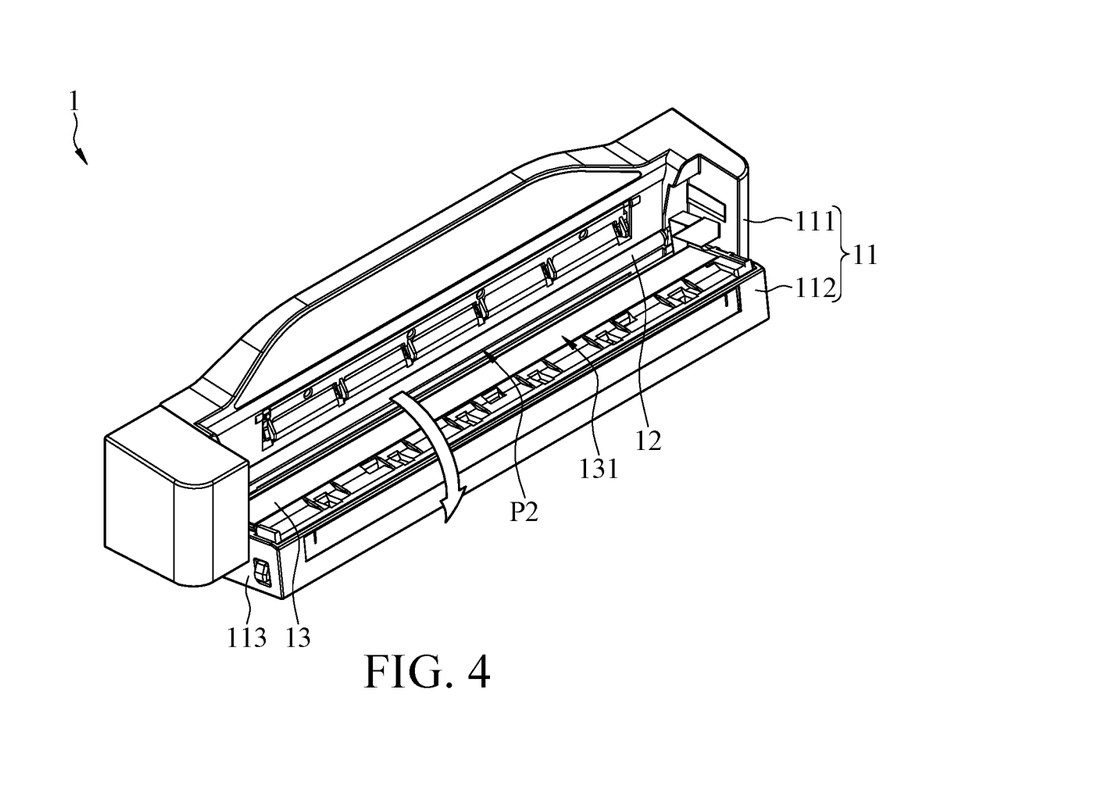
FIG. 4 is a schematic diagram of an appearance of a casing when being opened of an embodiment of the image scanning device of the present invention.
Figure 5:
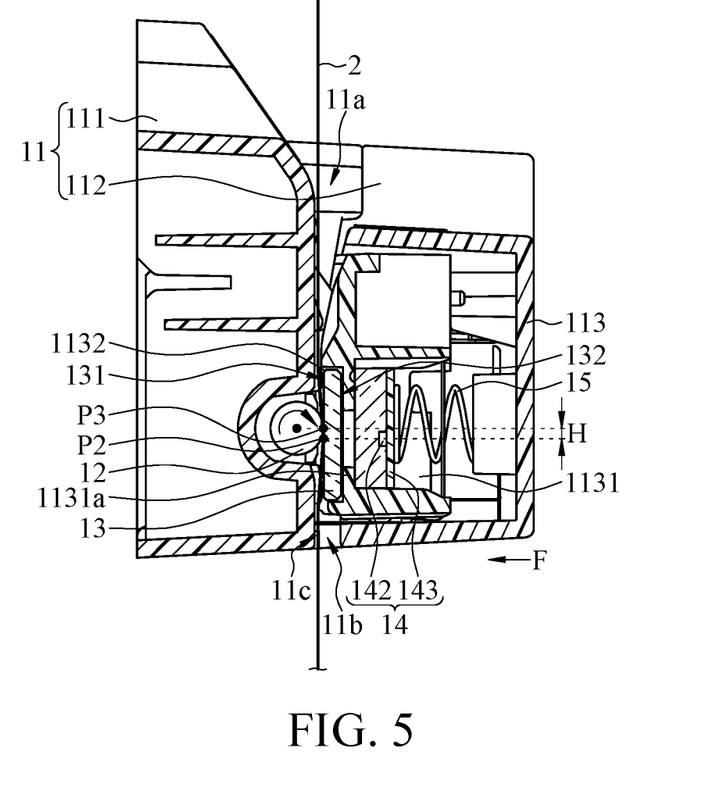
FIG. 5 is a cross-sectional view taken along line 5-5 in the embodiment shown in FIG. 3.

Referring to FIG. 3 to FIG. 5, FIG. 3 is a schematic diagram of an appearance of an embodiment of an image scanning device 1 of the present invention. FIG. 4 is a schematic diagram of an appearance of a casing 11 when being opened of an embodiment of the image scanning device 1 of the present invention. FIG. 5 is a cross-sectional view taken along line 5-5 in the embodiment shown in FIG. 3.

The image scanning device 1 is adapted to scan a document 2 (as shown in FIG. 5). The image scanning device 1 includes a casing 11, a paper feeding wheel 12, a transparent plate 13, a light bar 14, and an elastic support member 15. The casing 11 has a paper feeding channel 11c, and the paper feeding channel 11c is in communication with an outlet 11b and an inlet 11a on a surface of the casing 11. The paper feeding wheel 12 is disposed in the casing 11 and partially located in the paper feeding channel 11c. The paper feeding wheel 12 is a driving roller electrically connected to a motor. The transparent plate 13 is disposed in the casing 11 and at least partially located in the paper feeding channel 11c. The transparent plate 13 includes a first surface 131 and a second surface 132 opposite to each other. The first surface 131 faces the paper feeding wheel 12. In an embodiment, the transparent plate 13 is glass, for example. However, the present invention is not limited thereto. In some embodiments, the transparent plate 13 is a high-strength plastic material.

When the image scanning device 1 is used, the document 2 is, for example, paper, which contains characters or patterns, and the document 2 enters through the inlet 11a and passes between the paper feeding wheel 12 and the first surface 131. The light bar 14 is located on the second surface 132 of the transparent plate 13 and is close to the outlet 11b. The light bar 14 includes a substrate 143 and a plurality of light-emitting elements 142, and the light-emitting element 142 is, for example, a light-emitting diode (LED). The plurality of light-emitting elements 142 are distributed on the substrate 143 in an extension direction of the substrate 143, where a position at which the paper feeding wheel 12 is tangent to the first surface 131 defines a tangent position P3 (that is, the tangent is located at a position of the first surface 131). A position at which the light-emitting elements 142 that are linearly arranged are projected onto the first surface 131 in a normal direction of the first surface 131 defines a scanning position P2 (that is, the position of the projection line), and a scanning spacing H exists between the tangent position P3 and the scanning position P2, as shown in FIG. 5. With such setting, during the scanning and use of the document 2, the document 2 first touches the paper feeding wheel 12, drives the document 2 through the paper feeding wheel 12, and scanned through light scanning by the light bar 14. With the structure, the document 2 (such as paper) can be made smooth without wrinkles during the scanning, so as to avoid the problem of dirt and ink on the transparent plate 13 after long-term use. In some embodiments, the light bar 14 has a photosensitive element. In some other embodiments, the photosensitive element and the light bar 14 are arranged separately, and the present invention is not limited thereto.

In an embodiment, the scanning spacing H is less than 5 mm. Preferably, the scanning spacing H is in a range of 2 mm to 3 mm.

One end of the elastic support member 15 is fixed to the casing 11, and an other end of the elastic support member 15 is supported by the transparent plate 13, so as to provide a pushing force F for pushing the light bar 14 and the transparent plate 13 toward the paper feeding wheel 12. In some embodiments, the elastic support member 15 is a spiral spring, while in some embodiments, there are a plurality of elastic support members 15.

As shown in FIG. 4 and FIG. 5, in this embodiment, the casing 11 includes an upper casing portion 111 and a lower casing portion 112. One end of the upper casing portion 111 is pivotally connected to the lower casing portion 112, the paper feeding wheel 12 is located in the upper casing portion 111, the transparent plate 13, the light bar 14, and the elastic support member 15 are located in the lower casing portion 112, and the upper casing portion 111 is engaged with the lower casing portion 112 to form the paper feeding channel 11c.

In addition, in this embodiment, the casing 11 further includes a base 113. The base 113 includes a groove 1131, the transparent plate 13 covers an opening 1132 of the groove 1131, the light bar 14 and the elastic support member 15 are located in the groove 1131, and the elastic support member 15 is connected to the light bar 14. In addition, the groove 1131 includes two extension walls 1131a extending from side walls of the groove 1131 and located above the light bar 14.

As described above, in some embodiments, the elastic support member 15 is directly connected to the light bar 14 to provide the pushing force F for pushing the light bar 14 and the transparent plate 13 toward the paper feeding wheel 12. However, in some embodiments, the elastic support member 15 is connected to a bottom wall of the groove 1131, and may also provide the pushing force F for pushing the light bar 14 and the transparent plate 13, so that the paper feeding channel 11c is narrow to optimize the scanning effect of the document 2.

Figure 6:
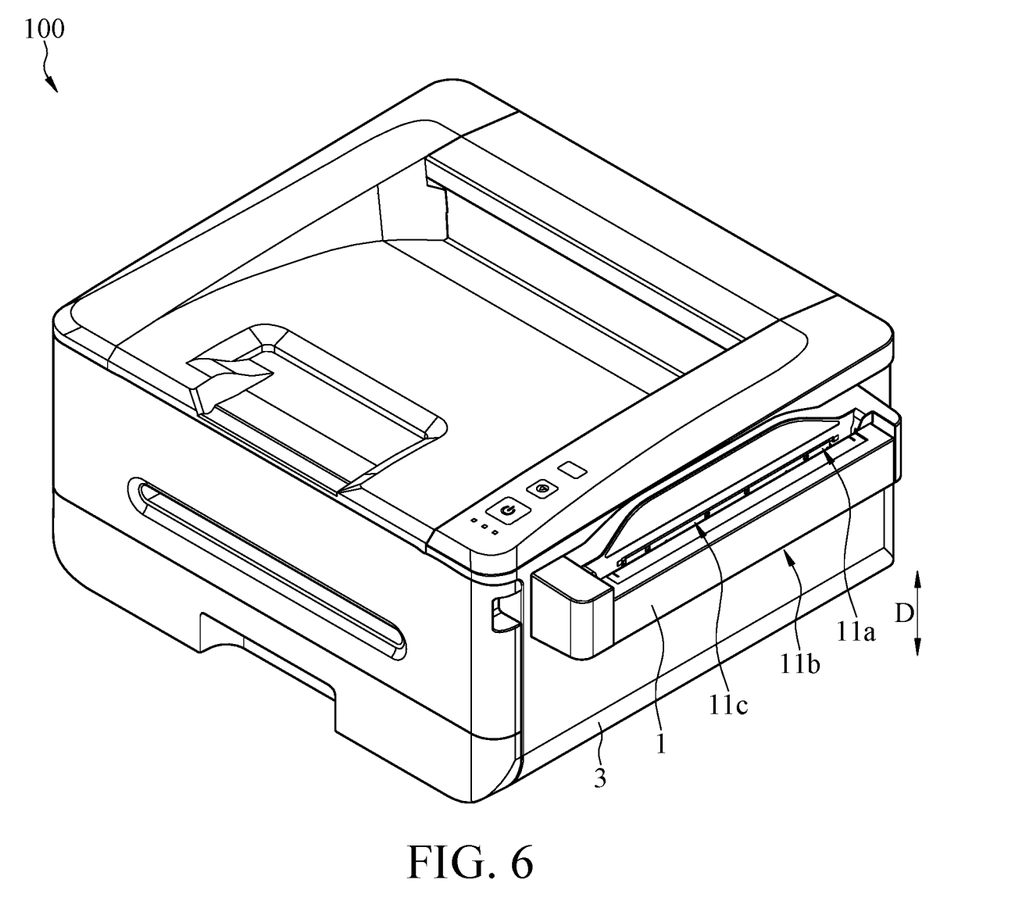
FIG. 6 is a schematic diagram of an appearance of an embodiment of image scanning equipment of the present invention.

FIG. 6 is a schematic diagram of an appearance of an embodiment of image scanning equipment 100 of the present invention. The image scanning equipment 100 includes the image scanning device 1 and an office machine 3 described above. The image scanning device 1 is mounted to the office machine 3 and may be installed inside or outside the office machine 3, and the present invention is not limited thereto. As shown in FIG. 6, in this embodiment, the image scanning device 1 is located on one side of the office machine 3, the inlet 11a is located above the outlet 11b, and a direction D from the inlet 11a towards the outlet 11b is perpendicular to the ground. In this way, the document 2 (paper) can be scanned more smoothly by gravity of the document 2 (as shown in FIG. 5).

Figure 7:
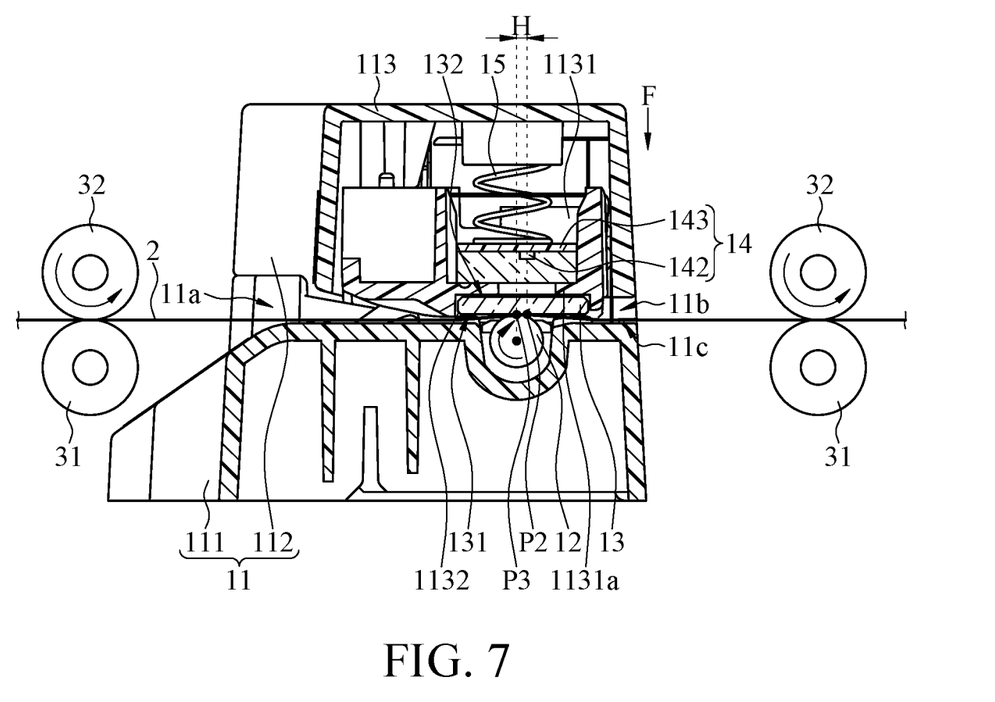
FIG. 7 is a cross-sectional view of another embodiment of the image scanning equipment of the present invention.

FIG. 7 is a cross-sectional view of another embodiment of the image scanning equipment 100 of the present invention. In this embodiment, the image scanning device 1 is installed inside the office machine 3, and the image scanning device 1 may be applied to the office machine 3 having two driven rollers 31 and two driving rollers 32. As shown in FIG. 7, the two driven rollers 31 are respectively located on two sides of the paper feeding wheel 12 and are tangent to the same plane as the paper feeding wheel 12. The two driving rollers 32 are respectively located on two sides of the transparent plate 13, and the two driving rollers 32 are jointly tangent to a plane on which the first surface 131 of the transparent plate 13 is located. The embodiment shown in FIG. 7 may be applied to scanning of a large-size document 2. Since the image scanning device 1 is disposed, the document 2 can be scanned smoothly without wrinkles, and the phenomenon of a black matrix of the image upon scanning can be reduced.

The image scanning device of at least one embodiment of the present invention has a single drive roller (the paper feeding wheel), and a scanning spacing exists between the position at which the paper feeding wheel is tangent to the transparent plate and the position at which the light-emitting elements are projected onto the transparent plate in a forward direction. Therefore, during the scanning, the document is moved by the paper feeding wheel and then scanned by the light bar. Through such a structure, the problem of dirt on the transparent plate after long-term use can be effectively solved, and the document can be caused to be smooth without wrinkles during the scanning, to obtain clear images, thus effectively solving the problem of the related art. In addition, in an embodiment, the image scanning device is mounted to the office machine, so that the direction from the inlet towards the outlet is perpendicular to the ground, which is used for scanning in such a way. By gravity, the scanning can be made smoother.

What is claimed is:

1. An image scanning device adapted to scan a document, wherein the image scanning device comprises:
   a casing having a paper feeding channel in communication with an outlet and an inlet on a surface of the casing;
   a paper feeding wheel disposed in the casing and partially located in the paper feeding channel;
   a transparent plate disposed in the casing and at least partially located in the paper feeding channel, wherein the transparent plate comprises a first surface and a second surface opposite to each other, wherein the first surface faces the paper feeding wheel, and the document enters through the inlet and passes between the paper feeding wheel and the first surface;
   a light bar located on the second surface of the transparent plate, wherein the light bar comprises a substrate and a plurality of light-emitting elements, wherein the light-emitting elements are distributed on the substrate in an extension direction of the substrate, wherein a position at which the paper feeding wheel is tangent to the first surface defines a tangent position, and a position at which the light-emitting elements are projected onto the first surface in a normal direction of the first surface defines a scanning position, wherein a scanning spacing exists between the tangent position and the scanning position; and
   an elastic support member, wherein one end of the elastic support member is fixed to the casing, and an other end of the elastic support member is supported by the transparent plate, so as to provide a pushing force for pushing the light bar and the transparent plate toward the paper feeding wheel.

2. The image scanning device according to claim 1, wherein the scanning spacing is less than 5 mm.

3. The image scanning device according to claim 2, wherein the scanning spacing is in a range of 2 mm to 3 mm.

4. The image scanning device according to claim 1, wherein the casing further comprises a base, wherein the base comprises a groove, the transparent plate covers an opening of the groove, the light bar and the elastic support member are located in the groove, and the elastic support member is connected to the light bar.

5. The image scanning device according to claim 4, wherein the groove comprises two extension walls extending from side walls of the groove and located above the light bar.

6. The image scanning device according to claim 1, wherein the casing comprises an upper casing portion and a lower casing portion, wherein one end of the upper casing portion is pivotally connected to the lower casing portion, the paper feeding wheel is located in the upper casing portion, the transparent plate, the light bar, and the elastic support member are located in the lower casing portion, and the upper casing portion is engaged with the lower casing portion to form the paper feeding channel.

7. Image scanning equipment, comprising:
   the image scanning device according to claim 1; and
   an office machine, wherein the image scanning device is mounted to the office machine.

8. The image scanning equipment according to claim 7, wherein the scanning spacing is less than 5 mm.

9. The image scanning equipment according to claim 8, wherein the scanning spacing is in a range of 2 mm to 3 mm.

10. The image scanning equipment according to claim 7, wherein the casing further comprises a base, wherein the base comprises a groove, the transparent plate covers an opening of the groove, the light bar and the elastic support member are located in the groove, and the elastic support member is connected to the light bar.

11. The image scanning equipment according to claim 10, wherein the groove comprises two extension walls extending from side walls of the groove and located above the light bar.

12. The image scanning equipment according to claim 7, wherein the casing comprises an upper casing portion and a lower casing portion, wherein one end of the upper casing portion is pivotally connected to the lower casing portion, the paper feeding wheel is located in the upper casing portion, the transparent plate, the light bar, and the elastic support member are located in the lower casing portion, and the upper casing portion is engaged with the lower casing portion to form the paper feeding channel.

13. The image scanning equipment according to claim 7, wherein the image scanning device is located on one side of the office machine, the inlet is located above the outlet, and a direction from the inlet towards the outlet is perpendicular to the ground.

14. The image scanning equipment according to claim 7, wherein the office machine comprises two driven rollers and two driving rollers, wherein the two driven rollers are respectively located on two sides of the paper feeding wheel and are tangent to the same plane as the paper feeding wheel; and the two driving rollers are respectively located on two sides of the transparent plate, and the two driving rollers are jointly tangent to a plane on which the first surface of the transparent plate is located.

\* \* \* \* \*